Oct. 4, 1927. W. E. NELSON ET AL Re. 16,753

INSULATING AND PLASTER HOLDING WALL AND CEILING COVERING

Original Filed March 5, 1926 2 Sheets-Sheet 1

INVENTORS
WILLIAM E. NELSON
THOMAS B. HENNESSEY
By Paul, Paul & Moore
ATTORNEYS

Oct. 4, 1927. W. E. NELSON ET AL Re. 16,753

INSULATING AND PLASTER HOLDING WALL AND CEILING COVERING

Original Filed March 5, 1926 2 Sheets-Sheet 2

INVENTORS
WILLIAM E. NELSON
THOMAS B. HENNESSEY
By Paul, Paul & Albert
ATTORNEYS Reissued Oct. 4, 1927. Re. 16,753

UNITED STATES PATENT OFFICE.

WILLIAM E. NELSON AND THOMAS B. HENNESSEY, OF MINNEAPOLIS, MINNESOTA; SAID HENNESSEY ASSIGNOR TO SAID NELSON.

INSULATING AND PLASTER-HOLDING WALL AND CEILING COVERING.

Original No. 1,598,981, dated September 7, 1926, Serial No. 92,541, filed March 5, 1926. Application for reissue filed June 17, 1927. Serial No. 199,613.

This invention relates to improvements in composition coverings designed for use particularly in forming interior and exterior walls, ceilings and partitions of building structures.

The object of the invention is to provide such coverings formed of felt or heavy paper that will act as non-conductors of heat and cold, and as sound deadeners; that are water proof, and are provided with a surface to which plaster may be directly applied, and to which it will rigidly adhere, thereby permitting walls, ceilings and partitions of buildings to be constructed without the use of the usual wood or metal lath and, if preferred, without the use of intermediate studding or posts.

The invention consists generally in the constructions and combinations hereinafter described and particularly pointed out in the claims.

Figure 1:
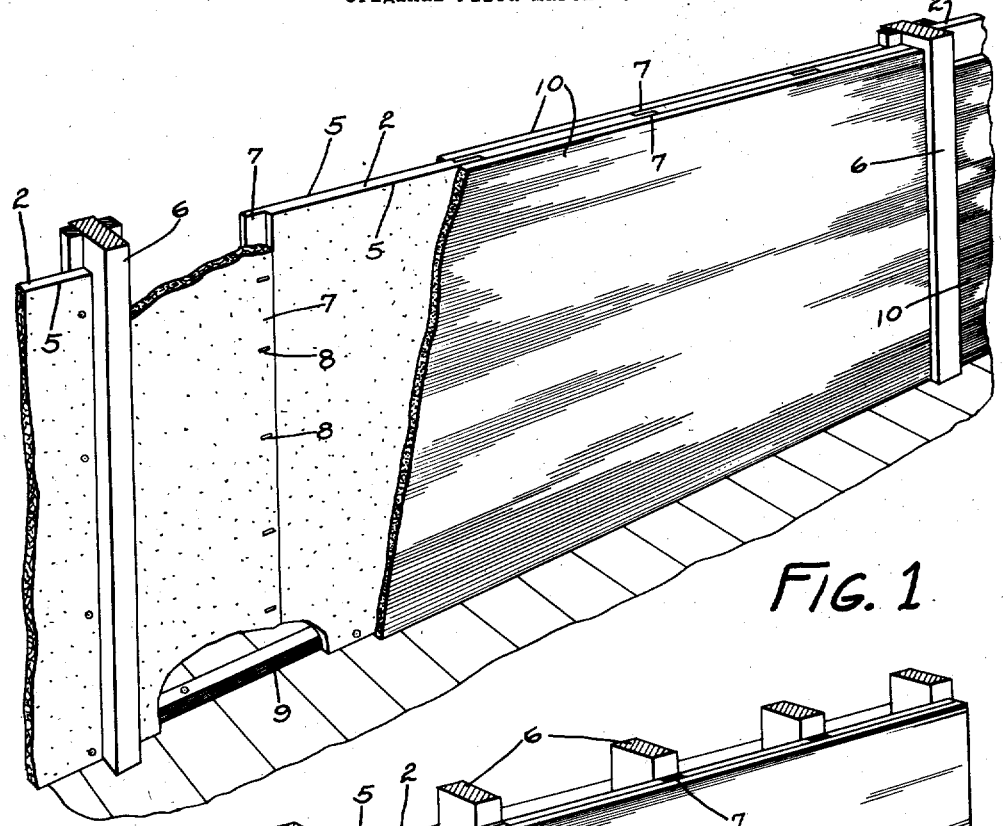
Figure 1 is a perpective view of a portion of an interior wall formed of our improved covering without any intermediate studding, and with plaster applied directly to the surface of said covering, a portion of the plaster being broken away to permit illustration of a portion of the surface of the covering.

In the drawings 2—2 represent sheets of what is known as "dry" or "unsaturated" felt, which is preferably composed of a mixture or vegetable and wool fiber, made by grinding up paper, rags and similar material. This material is preferably made in long sheets which are wound into rolls as the sheets are produced by the felting machine. The material is cellular in construction and forms excellent insulation against heat and cold and is also a non-conductor of sound.

Figure 2:
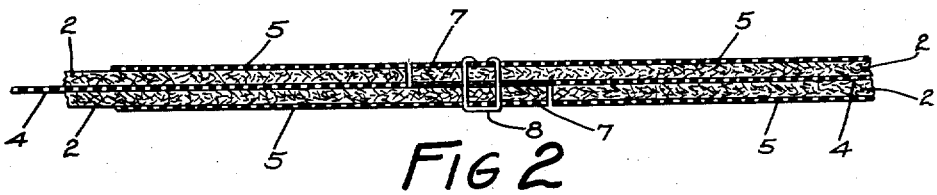
Figure 2 is a detail sectional plan of a portion of the wall shown in Figure 1 with the plaster omitted to illustrate how the overlapping edges of the covering may be secured together.

We preferably employ two sheets of like material and secure the same together by placing between them a layer of liquid asphalt 4 which not only binds the sheets together but forms a water proof coating between them. To the outer surface of one or both of the felt sheets, we also apply a coating of liquid asphalt 5. In Figure 2 we have shown the asphalt applied to both of the outer surfaces of the composite sheet. This arrangement will preferably be employed when the sheets are to be used for forming a partition or wall without intermediate studding, and to be plastered on both sides, as indicated in Figure 1 of the drawing. Where the sheets are to be secured to spaced studding 6, as shown in Figures 3 and 4, the asphalt need be applied to only one surface as indicated in Figure 5.

Figure 3:
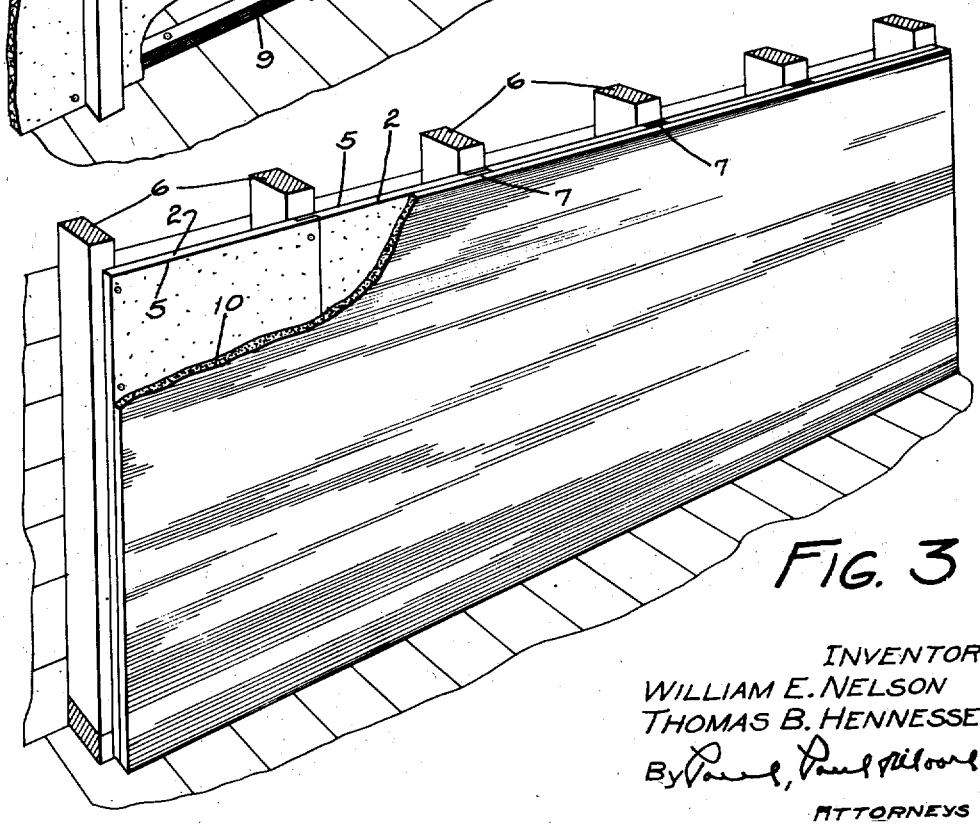
Figure 3 is a perspective view showing the covering nailed to vertical studding with the plaster applied to one surface of the sheets only.
Figure 4:
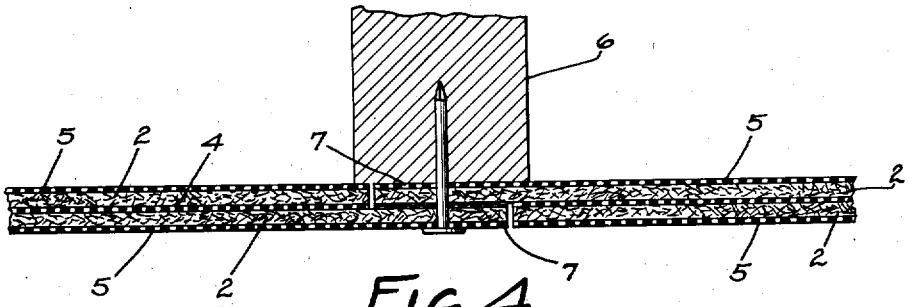
Figure 4 is a detail sectional plan of the structure shown in Figure 3 illustrating the manner of securing the overlapping edges of the sheets by a single row of nails.
Figure 5:
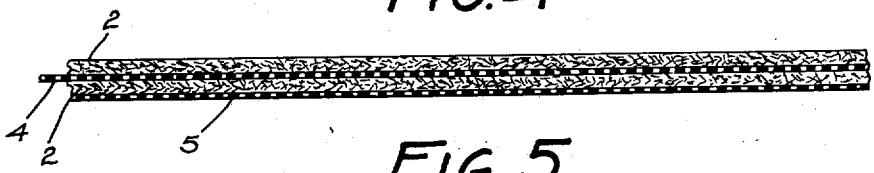
Figure 5 is a detail of the structure shown in Figure 3 with the asphalt layer applied to one surface of the composition covering only.

In forming the composite sheets we preferably arrange each sheet so as to project at its edge a short distance beyond the edge of the contiguous sheet, thereby making a projecting flange 7 at each edge of each sheet (see Figs. 3 and 4). When the sheets are to be used without spaced studding, as shown in Figure 1 of the drawing, the edges 7 of the sheets are overlapped, as shown in Figure 2, and are secured together by staples 8, or by suitable nails or cement. When the sheets are to be secured to spaced studding, as indicated in Figure 3, the overlapped edges of the sheets may be nailed to the studding, a single row of nails being used and driven through the overlapped edges of the sheets as shown in Figure 4.

Figure 6:
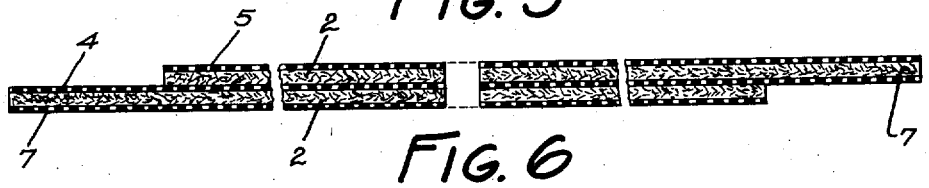
Figure 6 is a view illustrating how the sheets may be constructed with one edge adapted for an overlapping joint and the opposite edge for a butt joint.
Figure 7:
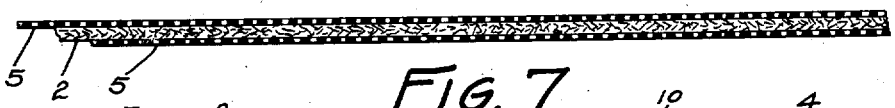
Figure 7 is a detail showing a single sheet with the asphalt layer applied to each surface thereof.

If preferred, the sheets may be overlapped, as described, so as to form a flange at each edge, as indicated in Figure 1, and then if preferred the sheets may be severed lengthwise as indicated in Figure 6, thereby forming two sheets, each having one edge adapted for a butt joint and its opposite edge provided with the flanged edge already described. For forming inside walls and partitions, we may use a single sheet of felt and apply the liquid asphalt thereto, preferably to both faces of the felt, as shown in Figure 7.

In building a wall or partition, if without the use of studding, the sheets are extended from top to bottom of the space to be enclosed and the upper and lower ends of the sheets are secured to horizontal strips 9 secured to the ceiling and flooring of the room, as shown in Figure 1. With such an arrangement the sheets will preferably be supplied with asphalt on both surfaces so that the plaster can be applied to both surfaces of the felt. The plaster will firmly adhere to the asphalt and to the felt sheet and will form a substantial and satisfactory partition without the use of studding or lath, the vertical sheets with the asphalt on each surface and the plaster applied directly to the asphalt forming in itself a substantial partition or wall.

We ordinarily employ what is known as "dry" felt, which is a cellular material composed of a mixture of vegetable and wool fiber made by grinding up paper, rags and similar material.

Figure 8:
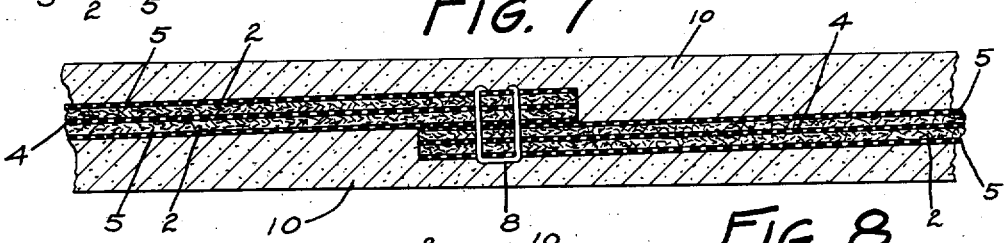
Figure 8 is a detail sectional view showing how two sheets may be secured together when not provided with the longitudinal flanges shown in Figure 6.
Figure 9:
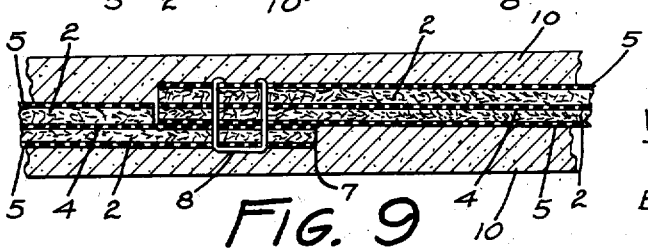
Figure 9 is a view similar to Figure 8 showing one of the sheets having a butt joint edge and the other a flanged edge.

It is not essential to have the flanges 7 on the edges of the sheets as the meeting edges of the sheets may be overlapped and staples or nails driven through the overlapping portions as shown in Figure 8, or one flanged edge and one butt edge may be inserted as shown in Figure 9. While this will leave a ridge in the surface, such ridge will be completely covered by the plaster which will in itself form a smooth surface firmly secured by the asphalt coating to the felt sheet.

We do not confine ourselves to any particular size or number of sheets to be used, as such details may be varied in many ways, without departing from our invention.

We claim as our invention:

1. A plaster wall comprising in combination a plurality of sheets, said sheets being united by a layer of asphalt, with a layer of asphalt upon the outer faces of the sheets and plaster applied to the outer surface of the asphalt coating.

2. A heat and sound insulating and plaster holding material comprising in combination a plurality of sheets of dry felt, said sheets being united by a layer of asphalt and with a layer of asphalt upon the face of one of the sheets forming a plaster holding surface.

3. Plaster holding material comprising in combination a plurality of sheets of flexible material, said sheets being arranged in overlapping relation, each sheet projecting beyond the edge of the contiguous sheet and said sheets being united by a layer of asphalt and a layer of asphalt upon the outer faces of said sheets forming plaster holding surfaces.

4. A plaster wall comprising in combination a sheet of cellular material with a layer of asphalt upon the face thereof, and plaster applied to the outer surface of the asphalt.

5. Plaster holding material comprising in combination a sheet of unsaturated felt with a layer of asphalt upon the face thereof forming a plaster holding surface.

6. A heat and sound insulating material comprising in combination a plurality of sheets of dry felt, said sheets being united by a layer of asphalt and with asphalt upon the faces of the sheets.

7. Heat and sound insulating material comprising in combination a sheet of unsaturated felt with a layer of asphalt upon the face thereof forming a surface adapted to receive plaster.

In witness whereof, we have hereunto set our hands this 14th day of June, 1927.

WILLIAM E. NELSON.
THOMAS B. HENNESSEY.